United States Patent
Baynard

(10) Patent No.: US 7,373,901 B2
(45) Date of Patent: May 20, 2008

(54) BIRD FEEDER

(75) Inventor: D. Calvin Baynard, Manning, SC (US)

(73) Assignee: Black River Tools, Inc., Manning, SC (US)

( * ) Notice: Subject to any disclaimer, the term of this patent is extended or adjusted under 35 U.S.C. 154(b) by 298 days.

(21) Appl. No.: 11/103,395

(22) Filed: Apr. 11, 2005

(65) Prior Publication Data

US 2006/0225658 A1    Oct. 12, 2006

(51) Int. Cl.
*A01K 39/01* (2006.01)
(52) U.S. Cl. .................. 119/57.9; 119/52.3
(58) Field of Classification Search .......... 119/52.2, 119/52.3, 57.8, 57.9, 52.1; D30/121, 124, D30/127, 128
See application file for complete search history.

(56) References Cited

U.S. PATENT DOCUMENTS

| | | | |
|---|---|---|---|
| 1,005,071 A * | 10/1911 | Randall | ............. 119/52.1 |
| 2,496,828 A | 2/1950 | Throckmorton | |
| 2,522,634 A | 9/1950 | Pittenger | |
| D174,139 S | 3/1955 | Sadler | |
| 2,891,508 A * | 6/1959 | Bower | ............. 119/52.3 |
| 2,931,336 A | 4/1960 | Cather | |
| 2,961,995 A | 11/1960 | Martin | |
| 3,090,354 A | 5/1963 | Merritt et al. | |
| 3,780,703 A | 12/1973 | Boehland, Jr. | |
| 4,188,913 A | 2/1980 | Earl et al. | |
| 4,389,975 A | 6/1983 | Fisher, Jr. | |
| 4,498,423 A | 2/1985 | Gainsboro et al. | |
| 4,558,662 A | 12/1985 | Peterson | |
| 4,765,277 A | 8/1988 | Bailey et al. | |
| 5,044,319 A * | 9/1991 | Blasbalg | ............. 119/57.9 |
| 5,062,390 A | 11/1991 | Bescherer et al. | |
| D330,097 S | 10/1992 | Bescherer et al. | |
| D333,538 S | 2/1993 | Kingsley | |
| 5,291,855 A | 3/1994 | Laverty | |
| 5,507,249 A | 4/1996 | Shaw | |
| 5,775,257 A | 7/1998 | Park | |
| 2006/0112892 A1 * | 6/2006 | Hunter et al. | ............. 119/57.8 |

* cited by examiner

*Primary Examiner*—T. Nguyen
(74) *Attorney, Agent, or Firm*—McNair Law Firm, P.A.

(57) ABSTRACT

A bird feeder having an upstanding circular housing with a cone shaped floor, a plurality of openings arranged about a lower edge of the housing and a feed assembly, associated with each opening. The feed assembly comprises a collar mounting a spout and includes an extension arranged beneath the spout. The extension has a threaded bore which receives a threaded first end of a rod. The opposite end of the rod is vertically offset from the first end providing a perch. The rod is laterally adjustable by adjusting the position of the first end in the bore which positions the perch at variable distances horizontally of an outer end of the spout. The position of the perch relative to the spout determines the size birds the feeder may accommodate.

14 Claims, 3 Drawing Sheets

BIRD FEEDER

BACKGROUND OF THE INVENTION

This invention is directed to a bird feeder which is constructed with the ability to be selective between the birds which can feed from it. The feeder is also constructed with multiple protections against squirrels feeding. The feeder includes apparatus for preventing food waste and for providing plural feed stations each associated with an individual food supply.

Accordingly, it is an object of this invention to provide a sturdy, attractive bird feeder.

Another object of this invention is to provide a bird feeder capable of selective bird feeding.

Another object of the invention is a bird feeder with multiple and individual feed supply areas.

Another object of the invention is a bird feeder in which the roof is provided with sufficient overhang to protect the feed from becoming wet.

Another object of the invention is a bird feeder which includes waste preventing feed spouts.

Another object of the invention is the provision of feed spouts which also act to shield the feed from rain.

Another object of the invention is a bird feeder constructed with multiple squirrel guards.

Another object of the invention is a bird feeder mountable from above or below.

SUMMARY OF THE INVENTION

The instant invention is directed to a bird feeder which includes a housing having a vertically directed circular side wall with an open upper end and a cone shaped flooring, connected about its outer end with the lower edge of the side wall. A removable cover is provided to be engaged over the open upper end of the housing.

A plurality of openings are arranged about the side wall adjacent its lower end. A plurality of feed assemblies, each of which includes a spout, a collar and a perch, are connected with the side wall in position for the spouts to extend through the openings. The inner ends of the spouts are positioned adjacent the outer edge of the flooring while the outer ends of the spouts are positioned outwardly of the side wall and above the inner ends. A perch is connected with each collar beneath the outer opening of each of the spouts. Each perch is horizontally adjustable, relative to the associated opening into selected positions relative to the associated spout opening.

In operation, food is supplied through the open upper end of the housing and is directed downwardly and outwardly toward the lower end of the side wall into positions adjacent the inner ends of the spouts by the cone shaped flooring. The horizontal adjusted position of each perch determines the size bird capable of feeding through the associated spout.

There is an opening through the apex of the flooring through which a shaft extends. The shaft is connected with the flooring and extends vertically through the housing. A connector is provided on the upper end of the shaft for securing a cover in position over the open end of the housing.

A downwardly directed receptacle is secured with the lower surface of the flooring and arranged along its axis. The receptacle is adapted to receive and secure with an upper end of a pole for supporting the feeder in an elevated position. Alternatively, a ring is secured with the connector. The ring is operative to engage with a depending support for hanging the feeder in an elevated position.

There is an upwardly directed lip arranged across a lower section of each of the outer openings of each spout. The lip acts to prevent spillage of the feed during bird feeding.

A rod having a threaded inner end is secured in axially adjustable positions with each collar. The rods are offset at a second end, the offset portion forming the perch.

The feeder may include a squirrel guard which comprises a downwardly directed tubular collar secured with the housing beneath the flooring. The collar is secured with the housing by the inner ends of the rods.

The feeder may include a divider positioned within the housing. The divider includes a plurality of vertically arranged fins in which each fin, at least substantially, engages with the flooring along its lower edge and with the peripheral wall along its outer edge forming separate compartments about each opening. A vertical groove is formed in the side wall. The groove is adapted to receive an outer end of a selected fin, locking the divider against rotation relative to the housing.

A collection tray which is carried by the pole mounting the feeder is vertically spaced beneath the housing. The tray is adapted to collect dropped food from the feed assemblies and to act as a second squirrel guard.

A bird feeder having an upstanding circular housing with a cone shaped flooring, a plurality of openings arranged about the housing adjacent an outer edge of the flooring and a feed assembly associated with each opening. The feed assembly includes a collar mounting a spout along an inwardly and downwardly directed acute angle. The collar includes a finger having a threaded bore arranged beneath the spout. A rod having a threaded first end and an offset second end forming a perch is threadably engaged with the bore at variable positions along its axis, positioning the perch at variable distances horizontally of an outer end of the spout. The various positions at which the perches are positioned relative to the associated spout determine the size bird capable of using the feeder.

Locking members which comprise bolts are carried by the threaded end of each rod and are adapted to engage with the collar locking the rods in position.

The feeder may include a circular extension which is secured with the housing beneath the flooring. The extension, which is circular and of selected length is positioned to extend downwardly beneath the flooring to act as a squirrel guard. The circular extension includes a plurality of spaced bores about its upper edge. The bores are positioned to engage with the first ends of the rods passing through the collars securing the extension with the housing.

Mounting members for mounting the housing in an elevated position are provided. The mounting members secure with the feeder in positions either above or below the housing.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Referring now in more detail to the drawings, the invention will now be described in more detail.

Figure 1:
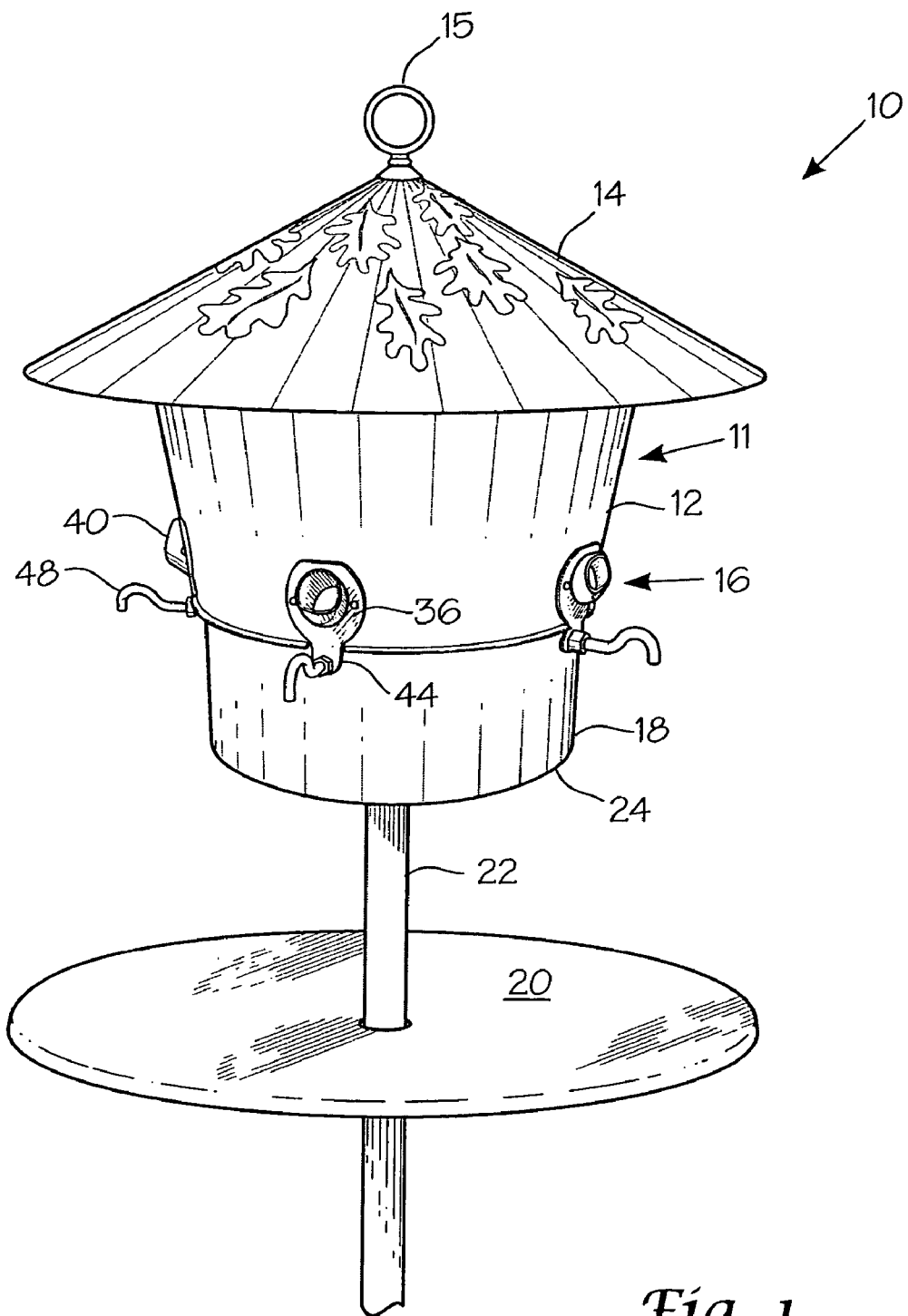
FIG. 1 is a perspective view of the feeder of the invention.

A typical bird feeder according to the invention is shown in FIG. 1. Feeder 10, which is preferably made of metal, includes housing 11 having a circular outer wall 12, a generally cone shaped cover 14, a plurality of feeding assemblies 16 and a fastener 15 for securing the cover in position. Mounted with housing 12 is a squirrel guard 18. Pole 22 secures with the underside of housing 12 and supports the feeder in an elevated position above the ground. Collection tray 20 is carried by pole 22 at a selected distance from the lower edge of the squirrel guard.

Turning now to FIGS. 2-5, a more detailed description of feeder 10 is provided.

Outer wall 12 is slightly cone shaped with an upper end diameter of about 15" and a lower end diameter of about 12". The housing is about 8" tall. These dimensions are completely optional and variations, both larger and smaller, are possible.

Cover 14 is constructed to overhang or extend beyond outer wall 12 by about 3". This overhang, in combination with the downward slope of the cover, provides both a squirrel guard and prevents rain from entering into the storage area, wetting the feed.

Figures 2, 3:
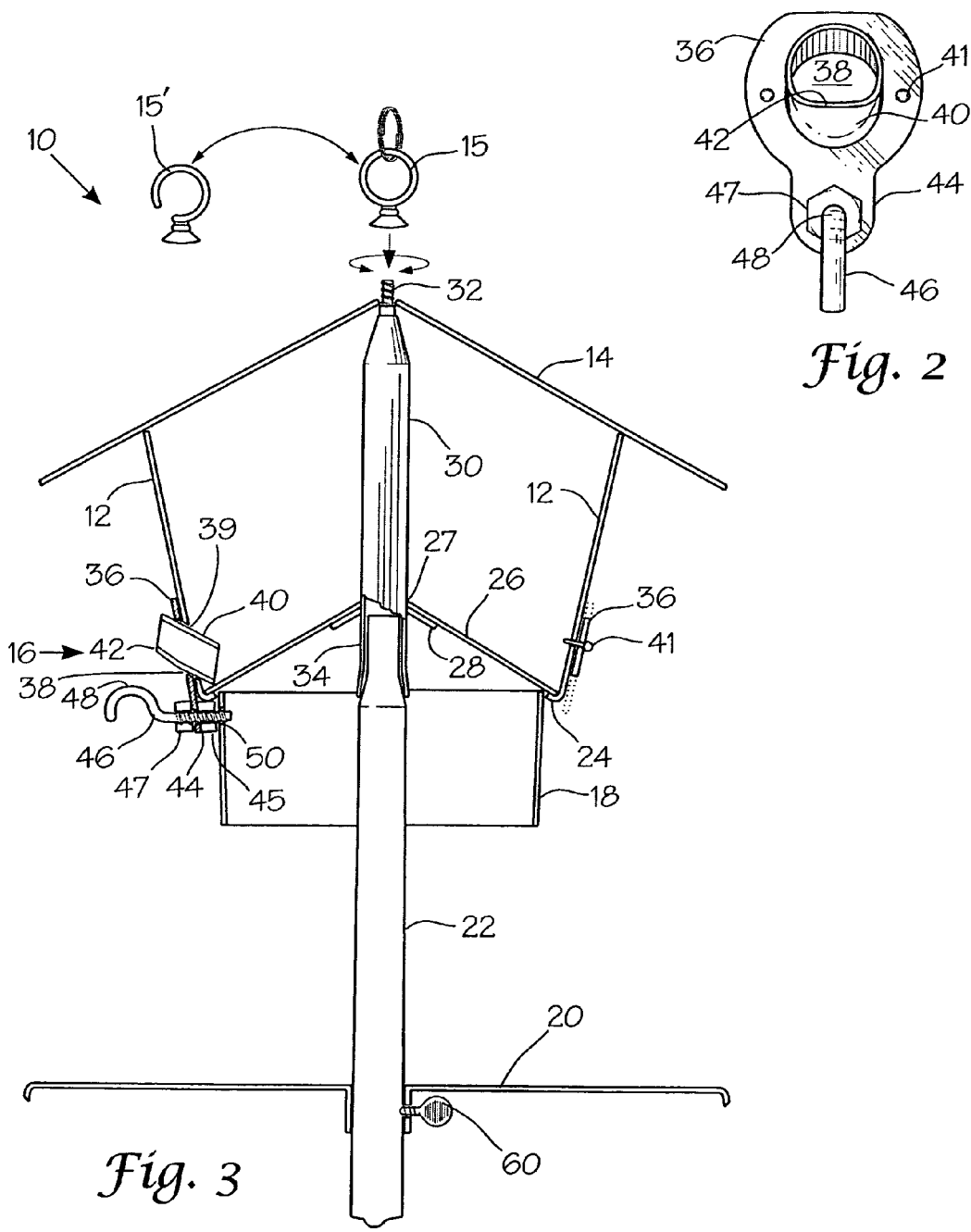
FIG. 2 is an isolated perspective view of a feeding assembly.
FIG. 3 is a cutaway side view of the feeder of the invention.

The lower end of housing 12 is turned under or inwardly crimped as shown at 24. Flooring 26 is generally cone shaped and upwardly directed forming an apex at its upper end as shown in FIG. 2. Flooring 26 is secured about its outer edge with the turned under or crimped lower end 24 of housing 12. Flooring 26 is secured with housing 12 preferably by welding, although other methods such as adhesives or simply crimping together is satisfactory. The flooring is arranged to extend along an angle of about 30°.

An opening 27 is formed in the apex of flooring 26 and a support collar 28, also having a central opening, is secured with the flooring about opening 27. Normally, collar 28 is made of heavier metal than the cover, housing or flooring. Hollow shaft 30 extends through collar 28 and opening 27 and is secured in fixed position relative to the side walls and flooring. The upper end 32 of shaft 30 is of reduced diameter, is located above the open upper end of side wall 12 and is adapted to secure with fastener 15.

Upper end 32 of shaft 30 passes through the opening in cover 14 and is engaged with ring 15 which secures the cover in position against upper edge 13 of side wall 12. The lower end of shaft 30, which is slightly below collar 28 and flooring 26, is open and is adapted to receive the upper end of a pole, such as 22, for supporting the feeder in an elevated position.

It is noted that feeder 10 may be supported in position by hanging utilizing ring 15 or by being supported from the underside by a pole as illustrated. Alternative ring arrangements are shown at 15 and 15[1].

Arranged about sidewall 12 adjacent its lower end 24 are a plurality of feeding assemblies 16, preferably five. Each feeding assembly includes collar 36, formed with an opening 38. Positioned in each opening 38 is tubular spout 40 which is secured with the collar along an angle of about 45°. Spouts 40 comprises a tube about 1" in diameter and length. Collars 36 are also formed of the heavier metal as is collar 28.

A plurality of openings 39 are arranged about the outer wall adjacent its lower end. A collar 36 is positioned over each opening 39 with its spout 40 passing through the opening with its inner end positioned below the apex of the flooring adjacent the outer edge of flooring 26. The collars are fixed to the side wall by brads 41 or other suitable means.

The outer end of spout 40 along its lower portion is bent upwardly to extend along an acute angle of about 40° and forming lip 42. Lip 42 acts as a shield or retainer which prevents feed from spilling or being pulled out by a feeding bird as it withdraws its head during feeding. While lip 42 does not totally prevent spillage, it significantly reduces the amount of feed which passes out of the spout. Also, opening 38 with lip 42, acts to shield the feed from rainwater and snow.

Located on the lower portion of collar 36 is extension 44. A bore passes through extension 44 and is adapted to receive the threaded end of rod 46. The bore may be threaded or there may be a nut 45 of equal size secured to the collar over the bore.

Rod 46 carried a locking nut 47 on its threaded end which functions to engage with collar 36 to lock rod 46 in position.

The opposite end of rod 46 may be bent to extend generally parallel but outwardly of the axis of the rod. This portion of the rod forms perch 48.

In use, rod 46 is screwed into bore 45 a distance to selectively position perch 47 from the outer end of spout 40. Perch 48 is always positioned in an upward position relative to the axis of rod 46 as is shown in the drawings. When perch 48 is located in the desired axial position outwardly of spout 40, locking nut 47 locks rod 46 in fixed position.

It is noted that the position of perch 48 from spout 40 determines the size bird capable of feeding through the spout. Only small birds can feed when the perch is in its most inward position while both large and small birds can feed from the perch when in its most outward position. Of course, an intermediate position would allow only small and intermediate size birds to feed.

It is noted that due to the angle of perch 48 relative to opening 38, the birds must be positioned sideways relative to the opening. This requires that the birds pick the feed rather than raking it out. Less feed is wasted as a result.

Squirrel guard 18 comprises a circular extension of about 4" in length. Guard 18 is of a diameter slightly less than the diameter of the lower end of side wall 12. Along the upper edge of the guard there are provided a plurality of threaded bores which are radially spaced to align with the bores through collars 36.

To position guard 18 with housing 11, rods 46 are moved to an outward position, guard 18 is positioned inwardly of collars 36 with the bores aligned. Rods 46 are then caused to pass through the bores of guard 18 locking it in position.

When a pole is used to mount the feeder in an elevated position, it may be desirable to position a collection tray 20 beneath housing 11. The collection tray is generally flat with a down turned outer edge and a diameter slightly larger than cover 14. The collection tray acts to catch feed drawn over lip 40. Collection tray 20 catches this feed and presents it for ground feeding birds. It also functions as an additional squirrel guard.

Figures 4, 5:
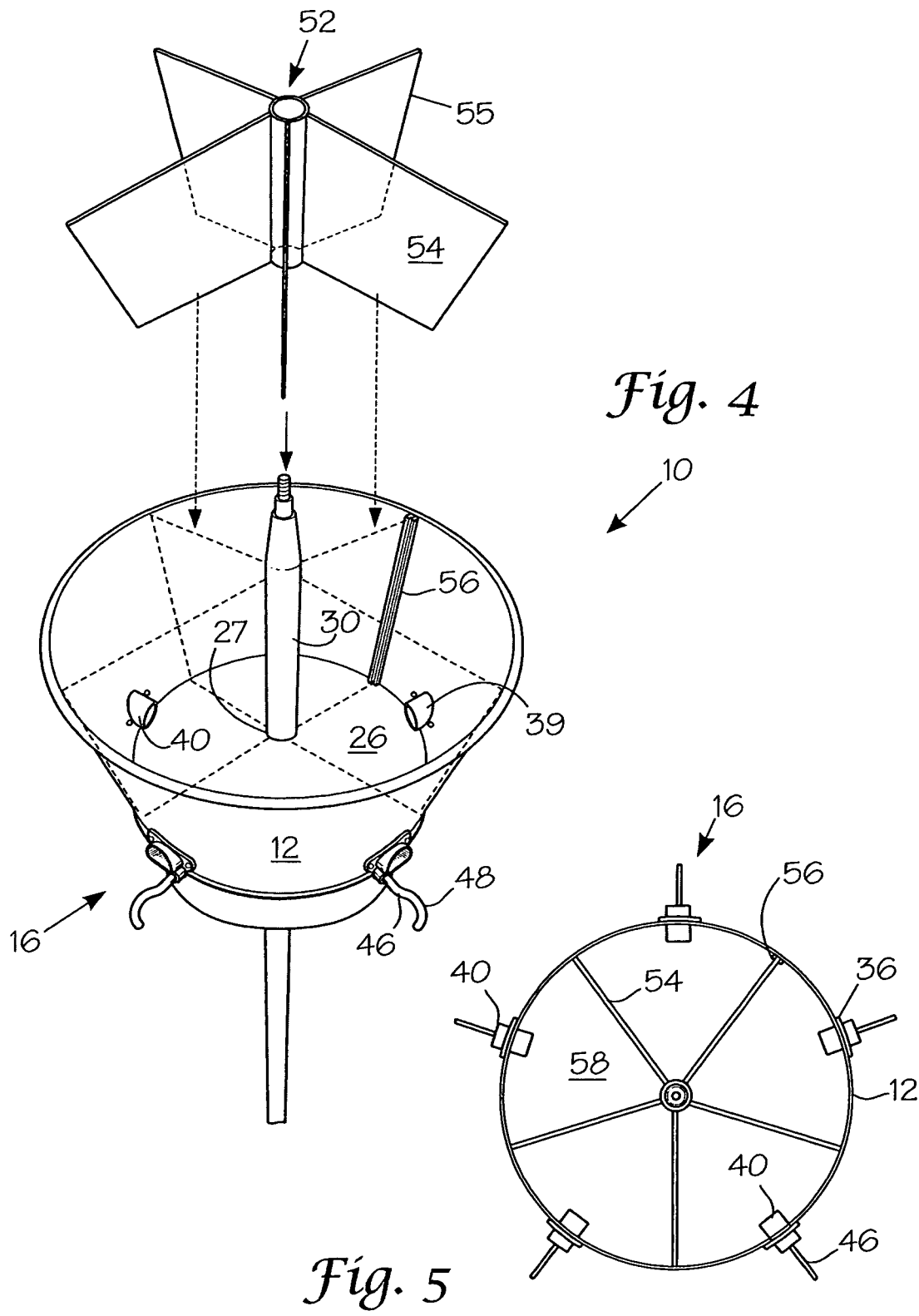
FIG. 4 is an exploded top perspective view of the feeder without the top.
FIG. 5 is a top view of the feeder without the top.

Turning now to FIGS. 4 and 5, housing 11 is shown with the cover removed. Above housing 11 is shown divider 52 which comprises a plurality of fins 54 secured along inner ends with a hollow extension 53. Fins 54 are arranged with extension 53 so that when positioned over shaft 30 the lower ends of fins 54 substantially engage with flooring along their length and their outer ends substantially engage with side wall 12 along their length. Divider 52 is positioned within housing 11 with dividers 54 on opposing sides of each feeding assembly 16 forming individual storage 58 for each spout 40. A groove 56 is formed vertically along side wall 12 in position to engage with an end portion of a single fin 54 locking divider 52 in position relative each spout 40 and against rotation.

In use, top 14 is removed and feed is supplied to the various storage areas 58. If desired, different types of feed are supplied to each storage area. The feed migrates to a position adjacent the outer edge of floor 26 adjacent lower end 24 of side wall 12 and the inner end of spout 40 due to the configuration of the floor. Perch 48 is adjusted, as determined by the type feed, to an appropriate radial position from the outer end of spout 40. The feeder is now ready to be positioned in an elevated position.

The feeder is preferably made of all metal, however, other materials such as plastics are suitable for wholly forming the feeder or for forming selected components thereof. It is preferred that the housing, to include the flooring, squirrel guard and fins be made of steel. It is preferred that the collars are made of steel. It is preferred that the spouts are made of steel.

While a preferred embodiment of the invention has been described using specific terms, such description is for illustrative purposes only, and it is to be understood that changes and variations may be made without departing from the spirit or scope of the following claims.

What is claimed is:

1. A bird feeder comprising:
   a housing having a vertically directed circular side wall connected about a lower end with an outer edge of an upwardly directed cone shaped flooring and an open upper end forming a storage area between said flooring and said upper end;
   a removable cover adapted to be engaged over said open upper end encasing said storage area;
   a plurality of openings arranged about said side wall adjacent said lower end;
   a plurality of feed assemblies, each including a collar carrying a spout connected with said side wall, each said spout passing through an associated of said openings along an acute angle positioning its inner end adjacent said flooring and beneath the apex of said cone shaped flooring with its outer end outwardly of said side wall and above said inner end;
   a rod arranged in a generally horizontal position beneath said outer opening of said spout, said rod being adjustable along its axis generally perpendicular of said wall;
   an opening extending through the apex of said flooring and a generally hollow mounting shaft connected with said flooring passing through said opening and extending vertically through said housing;
   a connector on the upper end of said mounting shaft for securing said cover in position over said open end, said mounting shaft extending downwardly below said flooring in position to receive and secure within said hollow interior an upper end of a pole for supporting said feeder in a elevated position; and
   a circular squirrel guard secured beneath and with said housing and extending longitudinally along said mounting shaft.

2. The feeder of claim 1 including a collection tray carried by said mounting shaft in vertically spaced position beneath said housing, said tray functioning to collect dropped food from said feed assemblies and as a second squirrel guard.

3. The feeder of claim 2 wherein said collection tray has a diameter greater than the diameter of said housing and said squirrel guard.

4. The feeder of claim 1 including an upwardly directed lip arranged across a lower section of each said outer opening of each said spout, said lip acting to prevent spillage of said feed during feeding.

5. The feeder of claim 1 wherein said squirrel guard is secured with said housing by inner ends of said rods.

6. The feeder of claim 1 including a divider positioned within said housing, said divider including a plurality of vertically arranged fins with each at least substantially engaged with said flooring along a lower edge and with said peripheral wall along an outer edge forming separate compartments about each said opening.

7. The feeder of claim 6 including a vertical groove formed in said side wall, said groove being adapted to receive an outer end of a selected fin, locking said divider against rotation.

8. A bird feeder which includes:
   an upstanding circular housing extending along a vertical axis, having a cone shaped floor, a plurality of openings arranged about said housing adjacent an outer edge of said cone shaped floor; and a feed assembly associated with each said opening, each said feed assembly comprising:
   a collar mounting a spout along an inwardly and downwardly directed acute angle, said collar being secured with said housing to position an inner end of said spout adjacent an outer edge of said flooring and beneath its apex;
   said collar including an extension arranged beneath said spout, said extension having a threaded bore there through;
   a rod having a threaded first end for securing with said bore and a second end forming a perch, said first end of said rod being threadably engaged with said threaded bore at selected positions axially of said rod positioning said second end at variable lateral distances from an outer end of said spout; and
   a locking member engaging said first end of said rod and said collar locking said second end of said rod in a selected of said variable positions and fixedly positioning said perch in said selected of said variable distances laterally of said outer end of said spout thereby controlling the size of the birds which may be accommodated by said feeder.

9. The feeder of claim 8 wherein said locking member comprises a bolt carried by said rod, said bolt locking with said collar.

10. The feeder of claim 8 including mounting members for mounting said housing in an elevated position, said mounting members securing with said feeder in one of above and below said housing.

11. The feeder of claim 8 including a squirrel guard comprising an elongate circular member secured substantially along an upper edge thereof with said housing to extend downwardly and generally parallel with said vertical axis beneath said flooring.

12. The feeder of claim 11 wherein said circular member includes a plurality of spaced bores about an upper edge, said first ends of said rods engaging in said spaced bores of said circular member securing said circular member with said housing.

13. The feeder of claim 8 wherein said feeder is made entirely of metal.

14. A bird feeder comprising:

an upstanding housing having a surrounding wall and a floor adapted to contain bird food;

a plurality of openings arranged about said wall adjacent said floor;

a threaded bore passing through a support member and located adjacent each said opening;

a rod having a threaded first end and a second end forming a perch, said first end of said rod being engaged with said threaded bore in selected axial positions laterally of said wall; and a locking member carried by said first end of said rod and engaging with said support member, said locking member being operable to lock said rod with said support member against rotation in said selected axial position; whereby, the axial position of said first end of said rod positions said second end of said rod from said wall at a selected distance, said selected distance controlling the size bird capable of feeding through said opening.

* * * * *